United States Patent
Toolan et al.

(10) Patent No.: US 12,446,552 B2
(45) Date of Patent: Oct. 21, 2025

(54) PET TOY

(71) Applicant: Benebone LLC, Westport, CT (US)

(72) Inventors: Peter Toolan, Westport, CT (US); Evan L. Ryan, Evanston, IL (US)

(73) Assignee: Benebone LLC, Westport, CT (US)

( * ) Notice: Subject to any disclaimer, the term of this patent is extended or adjusted under 35 U.S.C. 154(b) by 0 days.

(21) Appl. No.: 17/707,593

(22) Filed: Mar. 29, 2022

(65) Prior Publication Data

US 2022/0217946 A1 Jul. 14, 2022

Related U.S. Application Data

(63) Continuation-in-part of application No. 29/761,817, filed on Dec. 11, 2020, now Pat. No. Des. 968,725.

(60) Provisional application No. 63/172,472, filed on Apr. 8, 2021.

(51) Int. Cl.
*A01K 15/02* (2006.01)

(52) U.S. Cl.
CPC ................. *A01K 15/026* (2013.01)

(58) Field of Classification Search
CPC ........ A63H 33/00; A23K 50/00; A01K 15/02; A01K 15/0114
See application file for complete search history.

(56) References Cited

U.S. PATENT DOCUMENTS

| | | |
|---|---|---|
| 2,112,316 A | 3/1938 | Turner |
| 3,710,503 A | 1/1973 | Rylands |
| D310,691 S | 9/1990 | Axelrod |
| D330,614 S | 10/1992 | O'Rourke |
| D335,553 S | 5/1993 | Conner |
| D335,554 S | 5/1993 | Conner |
| D344,161 S | 2/1994 | Markham |
| D349,786 S | 8/1994 | Markham |
| 5,395,278 A | 3/1995 | Dickhut |
| D359,600 S | 6/1995 | Hotta et al. |
| D367,740 S | 3/1996 | O'Rourke et al. |
| D420,056 S | 2/2000 | Mauldin, Jr. |
| D427,391 S | 6/2000 | Gill |

(Continued)

FOREIGN PATENT DOCUMENTS

| | | |
|---|---|---|
| EM | 008718845-0001 | 10/2021 |
| EM | 008718845-0002 | 10/2021 |
| WO | 2012002966 A1 | 1/2012 |

OTHER PUBLICATIONS

Lumabone Ring Stuffer Durable Chew Toy for Aggressive Chewers, posted Feb. 17, 2022, retrieved Jan. 31, 2023 [online]. URL: https://www.amazon.com/dp/B09SRMFLSD (Year: 2022).

(Continued)

*Primary Examiner* — Joshua J Michener
*Assistant Examiner* — Henry Hooper Mudd
(74) *Attorney, Agent, or Firm* — Fred Zollinger

(57) ABSTRACT

A pet toy has a recess that is configured to hold a spreadable, edible substance in a manner that allows it to be removed by a pet such as a dog. Examples of the spreadable, edible substance are peanut butter, cream cheese, or a spreadable cheese. The pet toy has a hub with a straight inner wall that defines at least the upper portion of a recess. There are no overhangs so that the recess is easy to clean. A ring-shaped arm is connected to a middle portion of the hub to cause it to tilt when placed on a flat support surface.

19 Claims, 8 Drawing Sheets

(56) References Cited

U.S. PATENT DOCUMENTS

| | | | |
|---|---|---|---|
| 6,238,715 B1 | 5/2001 | Baikie | |
| 6,439,166 B1 | 8/2002 | Markham | |
| D470,277 S | 2/2003 | Tu | |
| 7,032,541 B1 | 4/2006 | Tsengas | |
| D523,593 S | 6/2006 | Wang | |
| D556,392 S | 11/2007 | Rutherford et al. | |
| D569,003 S * | 5/2008 | Roehrig | D24/194 |
| 7,506,614 B1 | 3/2009 | Tsengas | |
| D606,662 S * | 12/2009 | Ritchie | D24/197 |
| D612,552 S | 3/2010 | Matz | |
| D621,884 S | 8/2010 | Gold et al. | |
| D636,949 S | 4/2011 | Axelrod et al. | |
| D720,011 S | 12/2014 | Ishiwata | |
| 8,904,967 B2 | 12/2014 | Reiss et al. | |
| D743,551 S | 11/2015 | Gronberg | |
| D749,802 S | 2/2016 | Crane | |
| D812,340 S | 3/2018 | Falcone | |
| D835,859 S | 12/2018 | Steinkraus | |
| D837,465 S | 1/2019 | Steinkraus | |
| D840,610 S | 2/2019 | Toolan et al. | |
| D845,560 S | 4/2019 | Crane | |
| D853,055 S | 7/2019 | Cox | |
| D858,911 S | 9/2019 | Becattini, Jr. et al. | |
| 10,531,641 B2 | 1/2020 | Valle et al. | |
| D876,032 S | 2/2020 | Baker et al. | |
| D882,888 S | 4/2020 | Steinkraus | |
| D888,350 S | 6/2020 | Wolfe, Jr. et al. | |
| D891,008 S | 7/2020 | Zeng | |
| 11,123,648 B1 | 9/2021 | Denoual | |
| D938,664 S | 12/2021 | Willhelm | |
| D952,272 S | 5/2022 | Axelrod et al. | |
| D968,725 S | 11/2022 | Toolan et al. | |
| D976,334 S | 1/2023 | Capon | |
| 11,602,126 B1 * | 3/2023 | Delano | A01K 5/01 |
| D994,242 S | 8/2023 | Toolan et al. | |
| D1,014,873 S | 2/2024 | Toolan et al. | |
| D1,033,759 S | 7/2024 | Toolan et al. | |
| 2006/0172657 A1 | 8/2006 | Chen | |
| 2009/0069848 A1 | 3/2009 | Marcus et al. | |
| 2012/0298048 A1 | 11/2012 | Synytsya | |
| 2017/0303509 A1 * | 10/2017 | Stone | A01K 15/02 |
| 2018/0326318 A1 | 11/2018 | Blumenfeld et al. | |
| 2019/0098864 A1 | 4/2019 | Simon | |
| 2019/0133082 A1 | 5/2019 | Becattini, Jr. et al. | |
| 2021/0259210 A1 | 8/2021 | Wilhelm | |
| 2023/0337632 A1 | 10/2023 | Markham | |

OTHER PUBLICATIONS

Wild One, Twist Toss, Retrieved on Feb. 14, 2020 from https://wildone.com/products/twist-toss.

Kickstarter, PAWW, Retrieved on Feb. 14, 2020 from https://www.kickstarter.com/projects/1526951631/smart-fetch-treat-toys-from-paww-its-a-whole-new-b.

Chewy, Bionic Stuffer Dog Toy, Retreived on Feb. 14, 2020 from https://www.chewy.com/bionic-stuffer-treat-dispensing-tough/dp/143344.

Walmart, Flex-N-Chew Durable Dog Toys Hollow Treat Dispensing Floating Bobble or Squarble, Retrieved on Feb. 14, 2020 from https://www.walmart.com/ip/Flex-N-Chew-Durable-Dog-Toys-Hollow-Treat-Dispensing-Floating-Bobble-or-Squarble-Bobble-Blue-3/350306504.

Nylabone, Power Chew Extreme Chewing Dura Chew Souper Chicken Flavored Textured Ring Bone Dog Chew Toy, Retreived on Dec. 1, 2020 from https://www.amazon.com/Nylabone-Souper-Chicken-Flavored-Textured/dp/B0052SPB6S/ref=sr_1_51?dchild=1&keywords=ring+chew+toy&qid=1606774214&s=pet-supplies&sr=1-51.

Toolan, Design U.S. Appl. No. 29/761,817, filed Dec. 11, 2020, drawings.

* cited by examiner

PET TOY

CROSS REFERENCE TO RELATED APPLICATIONS

This application claims the benefit of U.S. Provisional Patent Application No. 63/172,472 filed 8 Apr. 2021; the disclosures of which are incorporated herein by reference. The application is a continuation-in-part application claiming priority to U.S. patent application Ser. No. 29/761,817 filed 11 Dec. 2020; the disclosures of which are incorporated herein by reference.

BACKGROUND OF THE DISCLOSURE

1. Technical Field

The disclosure relates to toys for pets and, more particularly toys that can be loaded with an edible material for the pet. Specifically, the disclosure relates to a multiple-purpose pet toy that can function as a chew toy itself and as a holder for a spreadable, edible material that can be consumed by the pet.

2. Background Information

A wide variety of pet toys exist in the art and many of these are designed for chewing by the pet or delivering edible treats to the pet. One category of these toys are designed to hold edible treats such as kibble that fall out of the toy. Other devices define areas where a spreadable substance such as peanut butter or cheese can be added to the toy. The dog using the toy can then remove the substance by licking.

Those who use these toys desire a configuration that remains stable during use so that the material is not spread around to different areas inside a dwelling while the dog finds a convenient position to remove the substance. The users also desire configurations wherein it is possible for the dog to remove substantially all of the material. Users also desire a configuration that is easy to wash wherein substantially all of the substance can be removed.

SUMMARY OF THE DISCLOSURE

The disclosure provides a pet toy configured to hold a spreadable, edible substance in a manner that allows it to be removed by a pet such as a dog. Examples of the spreadable, edible substance are peanut butter, cream cheese, or a spreadable cheese. The material can be removed by licking.

The disclosure provides a first configuration of a pet toy with a hub having a straight inner wall that defines a through opening configured to hold a spreadable substance such as peanut butter while also being configured for removal by a dog through the process of licking. The majority of the through opening is in the shape of a right cylinder and, more particularly, in the shape of a circular or oval right cylinder. The inner wall that defines the opening is free of corners, undercuts, overhangs, and protrusions. This configuration of the opening allows the pet to remove substantially all of the material loaded into the opening and the opening is easy to clean.

The disclosure provides a second configuration of a pet toy with a hub having a recess defined by a straight inner wall and a rounded bottom configured to hold a spreadable substance such as peanut butter while also being configured for removal by a dog through the process of licking. The majority of the recess opening is in the shape of a right cylinder and, more particularly, in the shape of a circular or oval right cylinder. The recess does not extend through the hub and is defined by a rounded bottom. The inner wall that defines the opening is free of corners, undercuts, overhangs, and protrusions. This configuration of the opening allows the pet to remove substantially all of the material loaded into the opening and the opening is easy to clean.

The disclosure provides a configuration of a pet toy wherein the terminal areas of the opening or recess defined by the hub are defined by rounded surfaces that are free of sharp corners that would be impacted by a dog's tongue while removing material from the opening. The opening and recess are surrounded by a rim that has a width of about half of the opening diameter to provide a broad surface with no sharp edges surrounding the opening.

The disclosure provides a configuration of a pet toy wherein one or a plurality of arms project from a central portion of the hub so that the hub can be tilted by pressing an arm downwardly against a support surface. This also tilts the bottom of the hub up away from the floor to limit the amount of material that is transferred from the hub to the support surface.

The disclosure provides a configuration of a pet toy that defines an opening with a length that is about twice the opening diameter.

The disclosure provides a configuration of a pet toy wherein the body of the toy is fabricated from a chewable material such as nylon that can be flavored.

The preceding non-limiting aspects, as well as others, are more particularly described below. A more complete understanding of the device and how it operates can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

Similar numbers refer to similar parts throughout the specification.

DETAILED DESCRIPTION OF THE DISCLOSURE

Figure 1:
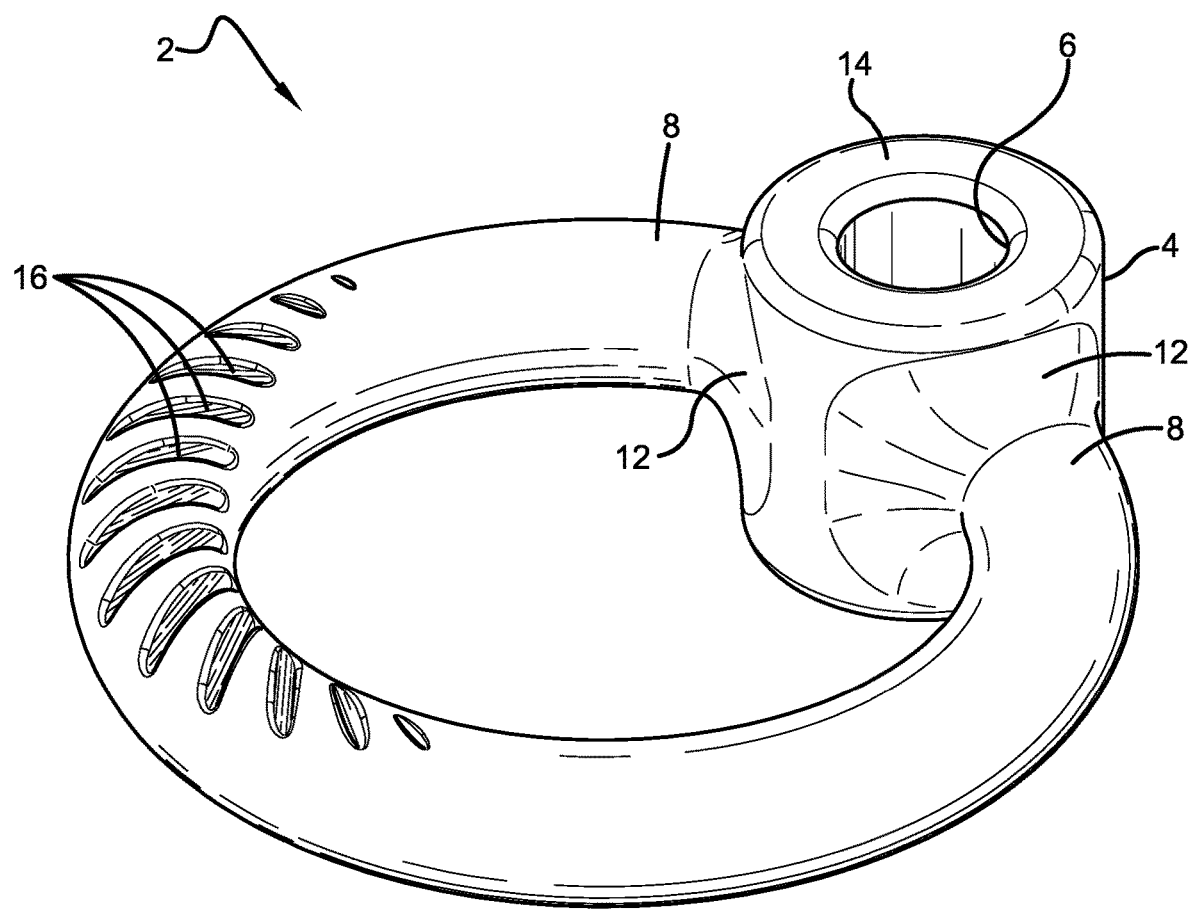
FIG. 1 is a perspective view of an exemplary first configuration for the pet toy.
Figure 2:
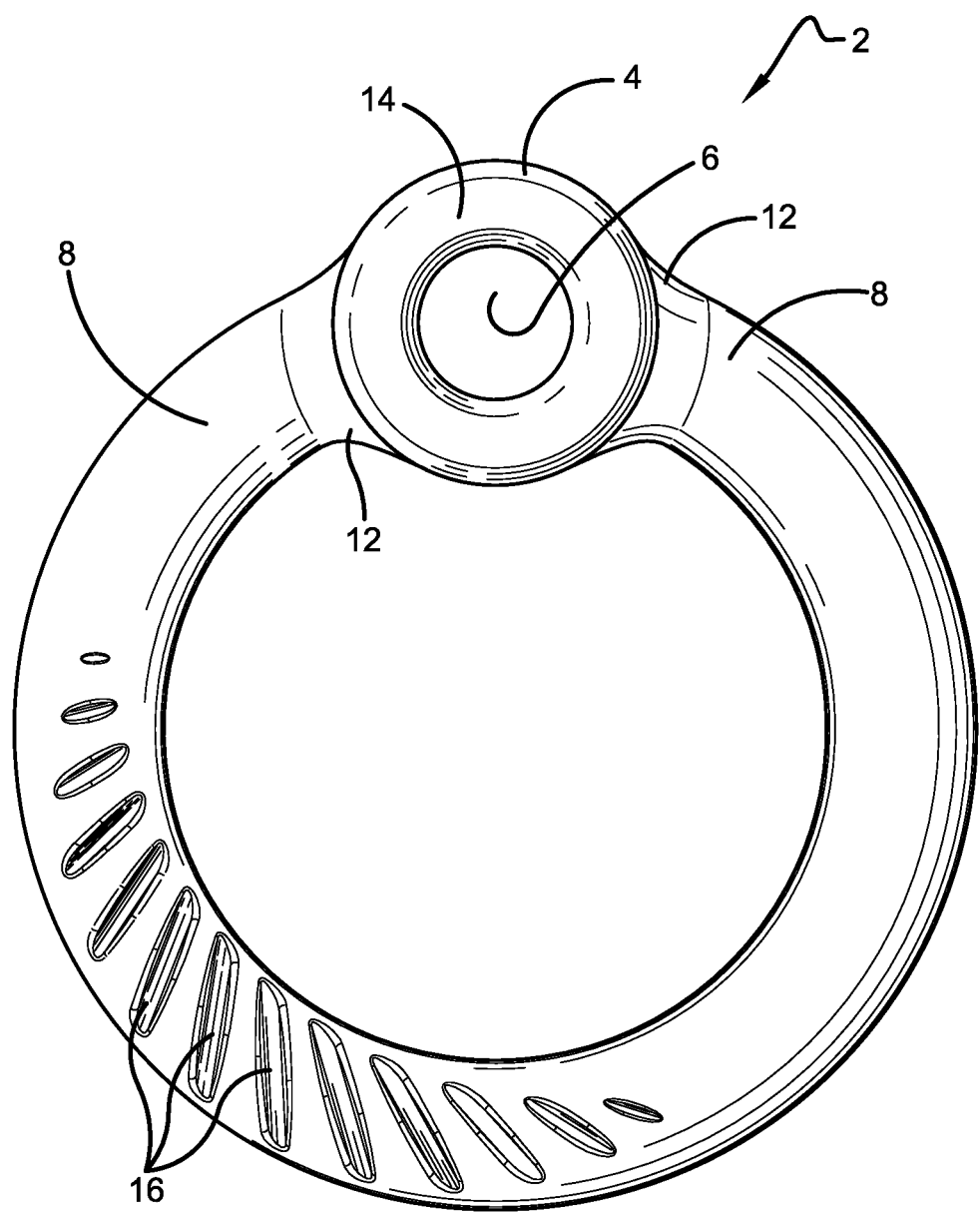
FIG. 2 is a top plan view of FIG. 1.
Figure 3:
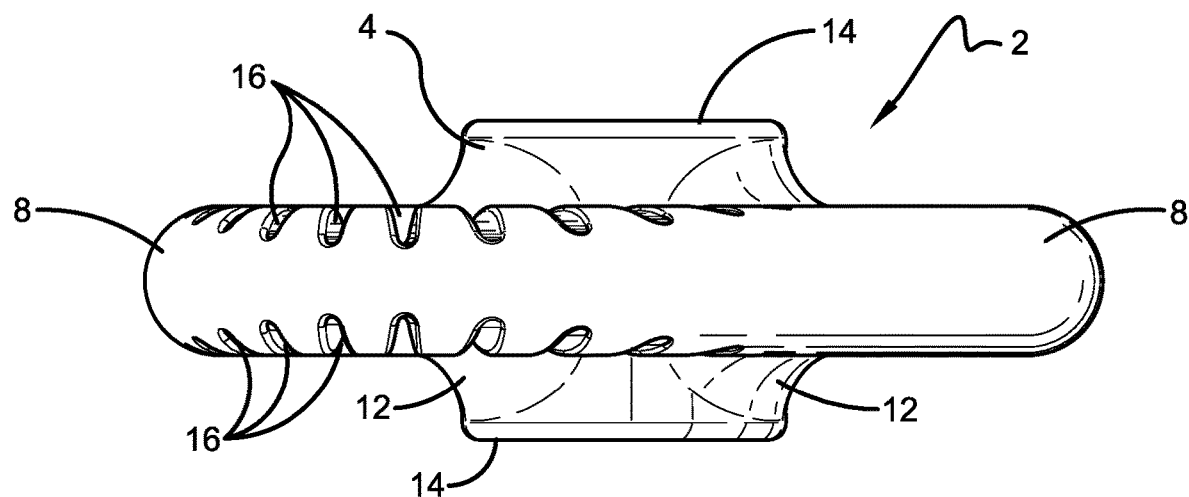
FIG. 3 is a front elevation view of FIG. 1 showing the outer wall of the central hub extending both above and below the arms.
Figure 4:
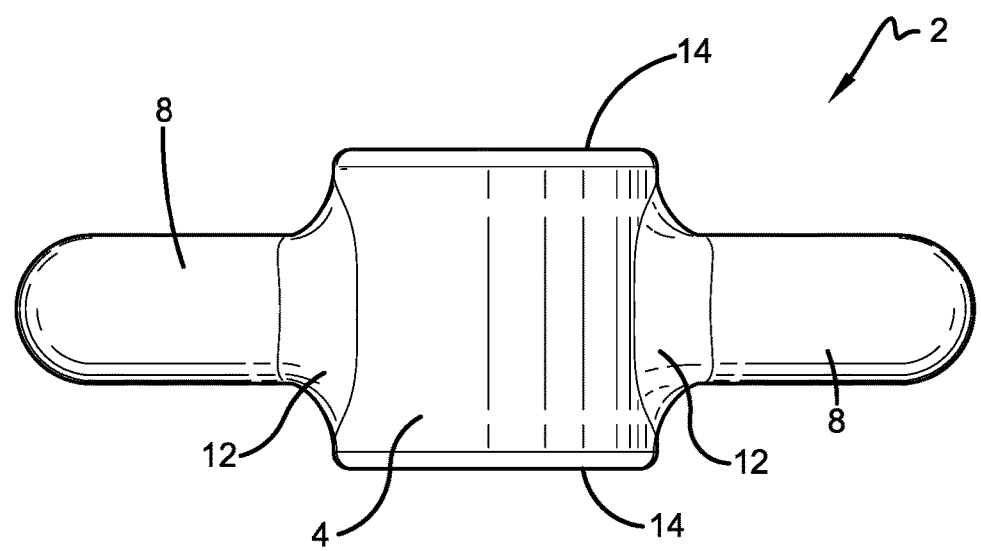
FIG. 4 is a rear elevation view of FIG. 1 showing the outer wall of the central hub extending both above and below the arms.

An exemplary configuration of the pet toy is indicated by the reference numeral 2 in the accompanying drawings. Toy 2 in the exemplary configuration includes a hub 4 that defines an opening 6. A pair of arms 8 extend from hub 4 and connect together to define a ring. A single arm 8 is used in other configurations. In still other configurations, arms 8 project from hub 4 and do not join with each other. In the exemplary configuration, the body of toy 2 itself functions as a chew toy that is made from a chewable material such as nylon. The nylon can be flavored with bacon or chicken. Toy 2 can be used to support a spreadable, edible material such as peanut butter, cream cheese, or a cheese within opening 6 from which the pet removes the substance by licking. The material can be frozen inside opening 6 by placing the loaded toy 2 in a freezer. Arms 8 provide grips for the pet and can be used to tilt toy 2 on a support surface 10 such that the lower end of opening 6 is raised off of surface 10.

Figure 5:
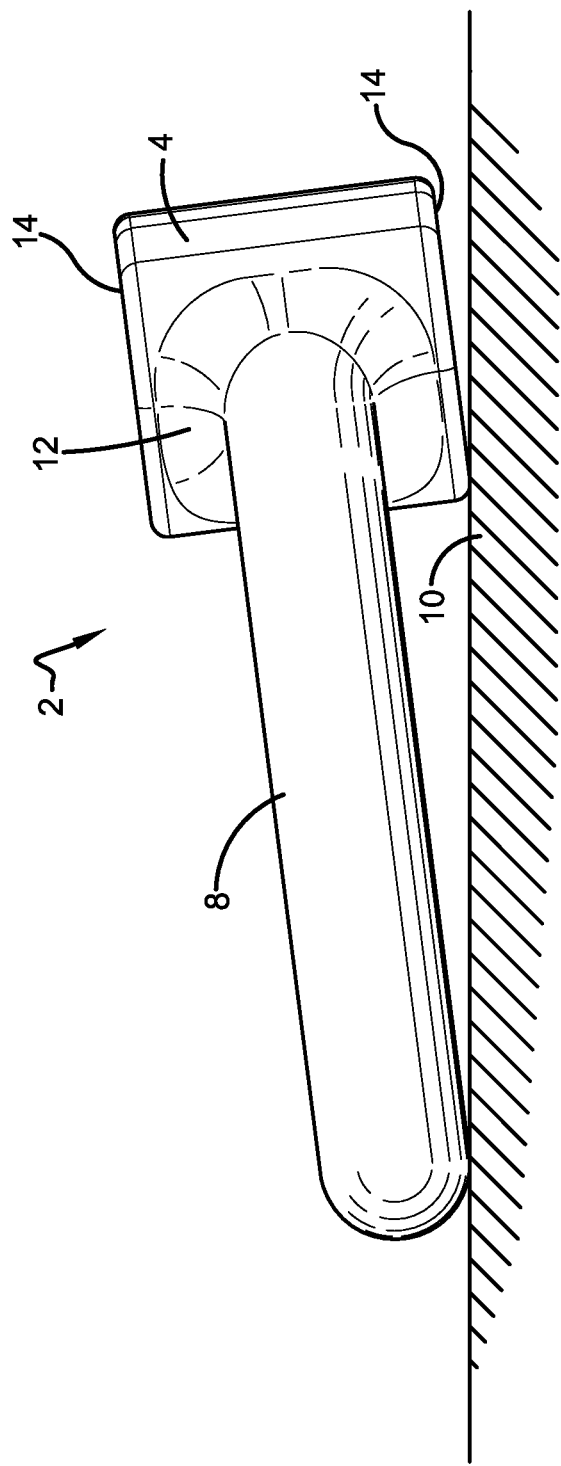
FIG. 5 is a right side view showing the toy tilted on a support surface as it is used when a dog pushes down on the arms with a paw while the toy is being used.
Figure 6:
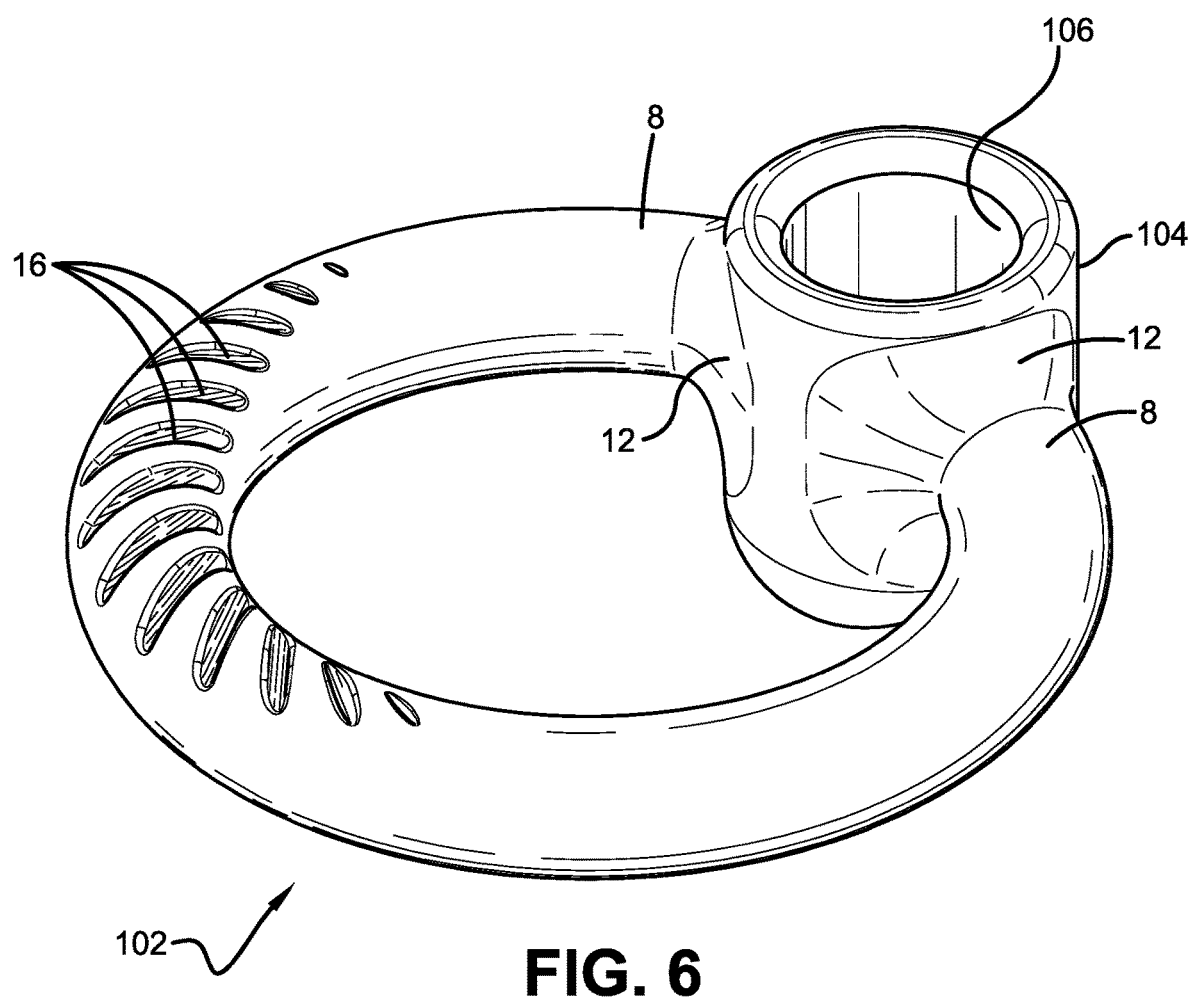
FIG. 6 is a perspective view of an exemplary second configuration for the pet toy.
Figure 7:
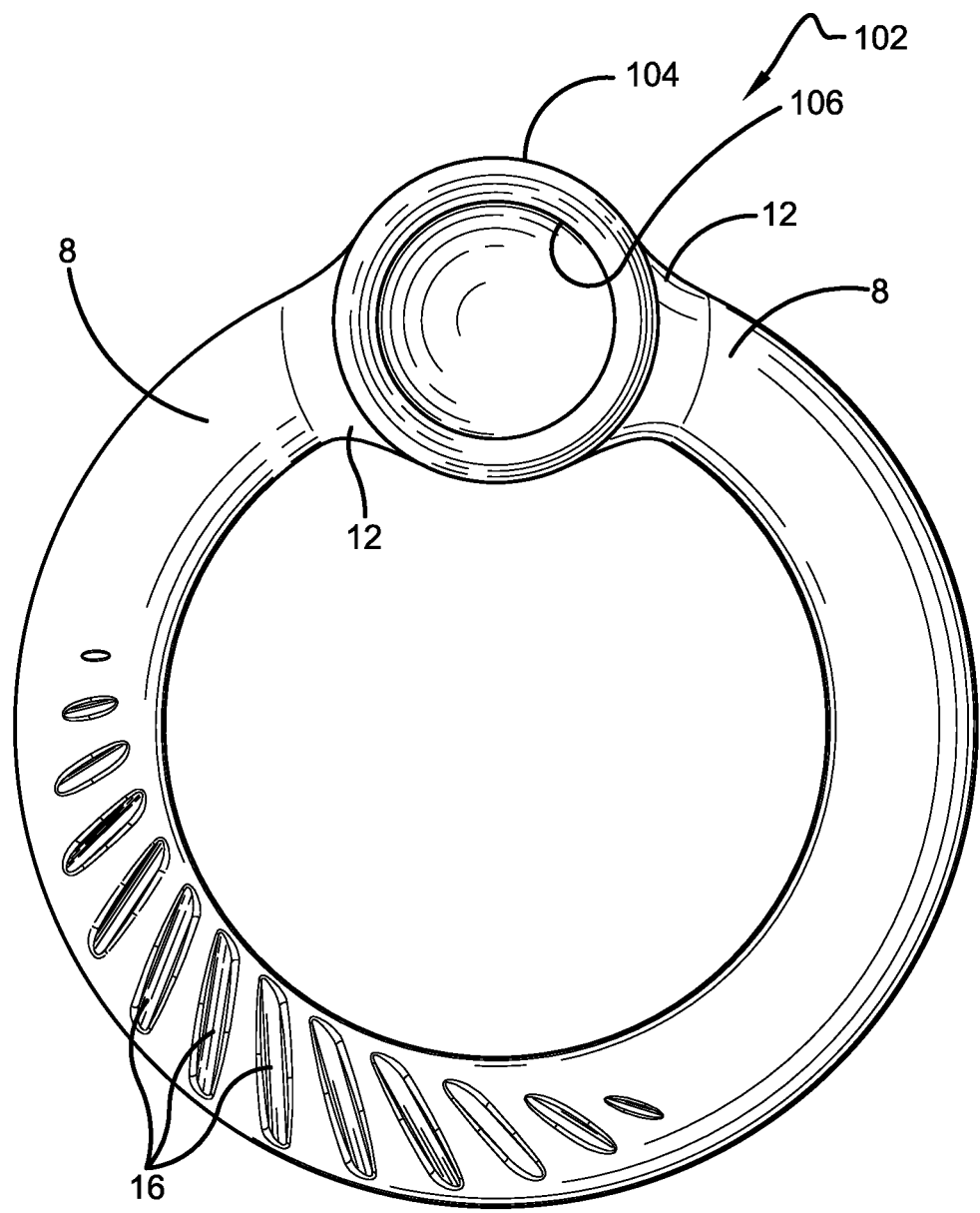
FIG. 7 is a top plan view of FIG. 6.
Figure 8:
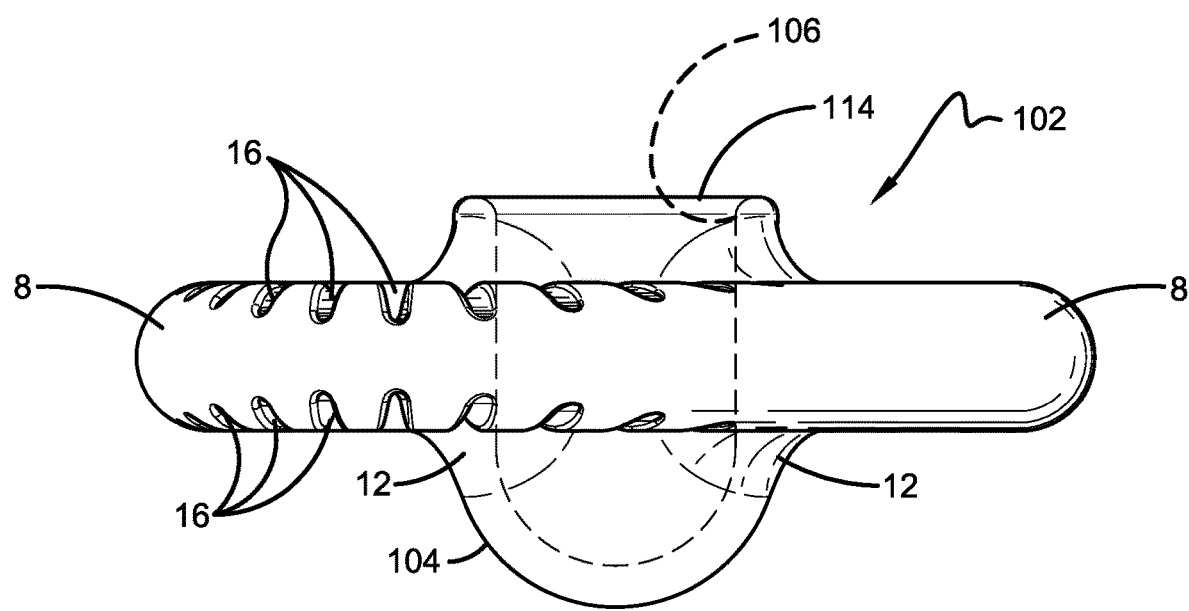
FIG. 8 is a front elevation view of FIG. 6 showing the outer wall of the central hub extending both above and below the arms.
Figure 9:
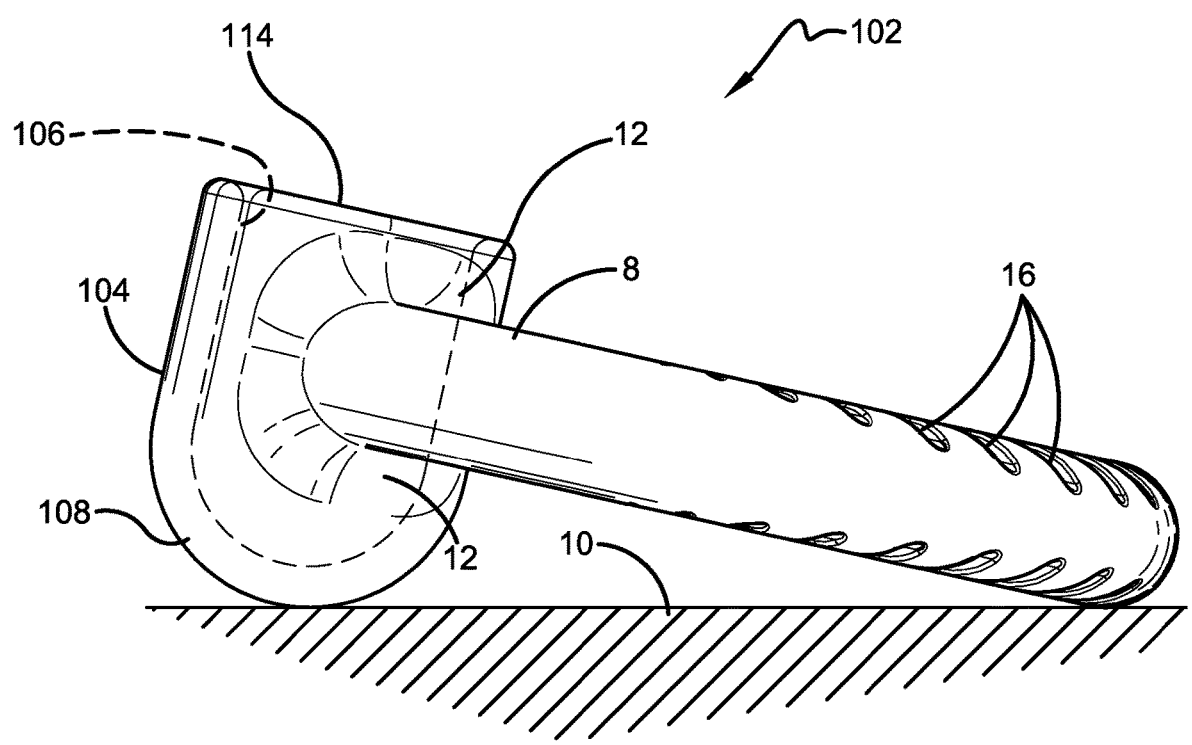
FIG. 9 is a left side view.

Arms 8 are centered along the height of hub 4 such that toy 2 can be tilted as shown in FIG. 5 regardless of which end of hub 4 is facing upward. The bottom of hub 4 is tilted about 5 to 15 degrees from horizontal at a minimum. Portions of the outer sidewall of hub 4 extend both above and below arms 8. Each arm 8 is joined with the sidewall of hub 4 with a smoothly curved neck portion 12 that smoothly merges arm 8 with the cylindrical outer sidewall surface of hub 4. When opening 6 is full of the spreadable substance, having the lower end of opening 6 lifted above surface 10 helps to prevent the material from leaving hub 4 and gathering on surface 10 from which it must be cleaned. The tilting of toy 2 occurs naturally as the pet places a paw on arm 8 or arms 8 to grip toy 2 while licking at the spreadable substance. Using joined arms 8 to define a ring allow hub 4 to be tilted regardless of where a pet pushes down on arms 8 with the degree of tilt changing as the downward pressure moves closed to hub 4. The ring-shaped arms 8 also allow toy 2 to rock back and forth as the downward pressure moves positions along the ring.

Opening 6 is defined by an inner sidewall of hub 4. The inner sidewall defines a right cylindrical sidewall that is perpendicular to the ring-shaped end surfaces 14 of hub 4. Opening 6 is in the shape of a right cylinder and, more particularly, in the shape of a circular right cylinder. Other shapes with smooth sidewalls can be used such as an oval right cylinder or another polygonal shape with rounded corners. The inner sidewall that defines opening 6 is free of sharp corners, undercuts, overhangs, and protrusions. This configuration of opening 6 allows the pet to remove substantially all of the material loaded into opening 6 and opening 6 is easy to clean.

Ring-shaped ends 14 are joined with the inner sidewall at rounded corners that are free of sharp corners that would be impacted by a dog's tongue while removing material from opening 6. Ring-shaped ends 14 have a width of about half to sixty percent of the opening diameter to provide a broad surface with no sharp edges surrounding opening 6. Ends 14 are also joined with the outer sidewall with rounded corners.

Opening 6 has a length (defined between the ends of hub 4) along the inner sidewall of hub 4 that is between about 1.8 and 2.2 times the maximum diameter or width of opening 6. Lengthening the opening compared to its diameter helps retain the spreadable material as the pet's tongue pushes on the ends of the material. However, the length should not be too long to prevent the pet from accessing all of the material and making the entire length of opening 6 hard to clean. In an exemplary configuration, opening 6 has a diameter of 0.90 inches with the height of hub 4 being 1.88 inches. Hub 4 has an outer diameter of 1.90 inches. Each arm is circular in cross section and has a diameter of 0.88 inches. The overall length of toy 2 is 6.14 inches measured from the farthest point on arms 8 away from hub 4 to the far point on hub 4 (left to right dimension in FIG. 5). Arms 8 define a ring having an outer diameter of 5.63 inches.

Arms 8 can define grooves 16 that add grip for a pet's claws.

Another exemplary configuration of the pet toy is indicated by the reference numeral 102 in FIGS. 6-9. Toy 102 in the exemplary configuration includes a hub 104 that defines a recess 106. A pair of arms 8 extend from hub 104 and connect together to define a ring. A single arm 8 is used in other configurations. In still other configurations, arms 8 project from hub 104 and do not join with each other. In the exemplary configuration, the body of toy 102 itself functions as a chew toy that is made from a chewable material such as nylon. The nylon can be flavored with bacon or chicken. Toy 102 can be used to support a spreadable, edible material such as peanut butter, cream cheese, or a cheese within recess 106 from which the pet removes the substance by licking. The material can be frozen inside recess 106 by placing the loaded toy 102 in a freezer. Arms 8 provide grips for the pet and can be used to tilt or rock toy 102 on a support surface 10 on the rounded lower end 108 of hub 104.

Arms 8 are disposed closer to the top of hub 104 than the bottom to allow toy 102 to rock back and forth. The bottom 108 of hub 104 is rounded and may be semi-spherical. Portions of the outer sidewall of hub 104 extend both above and below arms 8. Each arm 8 is joined with the sidewall of hub 104 with a smoothly curved neck portion 12 that smoothly merges arm 8 with the outer sidewall surface of hub 4. The tilting of toy 102 occurs naturally as the pet places a paw on arm 8 or arms 8 to grip toy 102 while licking at the spreadable substance. Using joined arms 8 to define a ring allow hub 104 to be tilted regardless of where a pet pushes down on arms 8 with the degree of tilt changing as the downward pressure moves closed to hub 104. The ring-shaped arms 8 also allow toy 102 to rock back and forth as the downward pressure moves positions along the ring.

Recess 106 is defined by an inner sidewall of hub 104. The upper portion of the inner sidewall defines a right cylindrical sidewall with the bottom portion of the wall defining a rounded bottom surface of recess 106. The upper portion of recess 106 is in the shape of a right cylinder and, more particularly, in the shape of a circular right cylinder. Other shapes with smooth sidewalls can be used such as an oval right cylinder or another polygonal shape with rounded corners. The inner wall that defines recess 106 is free of sharp corners, undercuts, overhangs, and protrusions. This configuration of recess 106 allows the pet to remove substantially all of the material loaded into recess 106 and recess 106 is easy to clean.

The upper end of hub 104 defines a thin raised rim 114 that helps a user remove a spreadable substance from a knife and into recess 106. Rim 114 is connected to the inner sidewall with a rounded corner and rim 114 is connected to the outer sidewall with a rounded corner.

Recess 106 has a diameter of 1.00 to 1.25 inches and a depth of 1.90 to 2.10 inches. Hub 104 has an outer diameter of 1.90 inches and a height of 2.35 inches. The ring has an outer diameter of 5.63 inches and an inner diameter of 3.88 inches.

Arms 8 can define grooves 16 that add grip for a pet's claws.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A pet toy device comprising:
   a body having a ring-shaped arm connected to a hub;
   the hub defining a recess adapted to receive a spreadable, edible material for a pet; the hub having an upper portion that defines an upper surface of the hub, a middle portion, a lower portion, and an outer sidewall; the lower portion of the hub defining a lower end of the hub;
   the recess being open through the upper surface with the upper surface extending entirely around the recess;
   the lower end of the hub being rounded and defining a closed inner end of the recess;
   an upper portion of the recess being defined within the hub by an inner sidewall;
   the ring-shaped arm connected to the middle portion of the hub between the upper surface of the hub and the lower end of the hub with the upper portion of the hub projecting above the ring-shaped arm and the lower portion of the hub projecting below the ring-shaped arm;
   when the ring-shaped arm is positioned horizontally, the ring-shaped arm having an uppermost portion and a lowermost portion;
   the ring-shaped arm defining a ring opening that is located next to the hub; the ring opening having an inner maximum opening dimension that is larger than an outer maximum width dimension of the hub;
   the ring-shaped arm having first and second arm ends that connect the ring-shaped arm to the hub; each arm end having a centerline; the hub being aligned with the centerline of each arm end;
   portions of the hub projecting outwardly and inwardly of the arm ends; and
   when the pet toy is positioned with the ring-shaped arm positioned horizontally, the entire upper surface of the hub being positioned higher than the uppermost surface of the ring-shaped arm and the entire lower end of the hub being positioned lower than the lowermost surface of the ring-shaped arm.

2. The device of claim 1, wherein a lower portion of the hub recess is defined by a rounded bottom wall.

3. The device of claim 1, wherein the connections between the hub and the arm ends are closer to the upper surface of the hub than the lower end of the hub.

4. The device of claim 3, wherein the hub has a height between the upper surface and the lower end; the hub having a width; the arm ends having cross sections with maximum diameters smaller than the height of the hub and smaller than the width of the hub.

5. The device of claim 1, wherein the upper surface of the hub is flat; the upper surface being circular, ring-shaped, and planar.

6. The device of claim 5, wherein the minimum distance from the inner sidewall of the hub to the outer sidewall of the hub is smaller than a maximum width of the recess.

7. The device of claim 1, wherein the inner sidewall is perpendicular to the upper surface.

8. The device of claim 7, wherein the upper surface is joined with the inner sidewall at a rounded corner surface.

9. The device of claim 8, wherein the upper surface is joined with the outer sidewall with a rounded corner surface.

10. The device of claim 1, wherein the body of the pet toy device is free of portions that overhang the recess.

11. The device of claim 1, wherein the ring-shaped arm does not encircle the hub.

12. A pet toy device comprising:
    a body having an arm connected to a hub;
    the hub defining a recess adapted to receive a spreadable, edible material for a pet; the hub having an upper surface and a lower portion; the lower portion defining a lower end; the recess opening through the upper surface of the hub;
    the lower portion of the hub being rounded;
    the body being free of portions located within the recess and the body being free of portions that overhang the recess;
    the hub having a height between the upper surface and the lower end; the hub having a maximum width;
    portions of the hub projection above and below the arm; and
    portions of the hub projecting from both sides of the arm.

13. The device of claim 12, wherein the arm is closer to the upper surface of the hub than the lower end of the hub.

14. The device of claim 12, wherein the upper surface of the hub defines a rim that surrounds the recess; the rim being connected to an outer surface of the hub with a rounded corner; and the rim being connected to the upper portion of the inner sidewall with a rounded corner.

15. The device of claim 12, wherein the arm defines a loop.

16. The device of claim 12, wherein the recess has a maximum width at the upper surface of the hub.

17. A pet toy device comprising:
    a body having an arm connected to a hub;
    the hub defining a recess adapted to receive a spreadable, edible material for a pet;
    the hub having an upper end and a lower portion;
    the lower portion of the hub defining a lower end of the hub;
    the recess being open through the upper end such that the upper end extends around the recess;
    the upper end being located at a common height above the lower end;
    the recess having a maximum width dimension at the upper end;
    the body being free of portions located within the recess and the body being free of portions that overhang the recess;

the arm having a height and a width;
the hub having a height between the upper end and the lower end; the hub having a maximum width;
portions of the hub projection above and below the arm; and
portions of the hub projecting from both sides of the arm.

18. The device of claim 17, wherein the lower portion of the hub is rounded.

19. The device of claim 17, wherein the arm is ring-shaped.

* * * * *